United States Patent
Choi et al.

(10) Patent No.: US 8,496,722 B2
(45) Date of Patent: Jul. 30, 2013

(54) NONWOVEN FOR AIR FILTRATION AND A PREPARATION METHOD THEREOF

(75) Inventors: Jin-Hwan Choi, Daegu (KR); Jin-Il Kim, Gumi-shi (KR); Sang-Mok Lee, Gumi (KR)

(73) Assignee: Kolon Industries, Inc., Kwacheon (KR)

( * ) Notice: Subject to any disclaimer, the term of this patent is extended or adjusted under 35 U.S.C. 154(b) by 321 days.

(21) Appl. No.: 12/747,709

(22) PCT Filed: Dec. 15, 2008

(86) PCT No.: PCT/KR2008/007414
§ 371 (c)(1), (2), (4) Date: Jun. 11, 2010

(87) PCT Pub. No.: WO2009/078642
PCT Pub. Date: Jun. 25, 2009

(65) Prior Publication Data
US 2010/0269465 A1    Oct. 28, 2010

(30) Foreign Application Priority Data

Dec. 14, 2007 (KR) .................. 10-2007-0130717
Dec. 15, 2008 (KR) .................. 10-2008-0127032

(51) Int. Cl.
    *B01D 46/00* (2006.01)
(52) U.S. Cl.
    USPC ............... 55/487; 55/486; 55/528; 55/DIG. 5
(58) Field of Classification Search
    USPC .................. 55/486, 487, 527, 528, DIG. 5
    See application file for complete search history.

(56) References Cited

U.S. PATENT DOCUMENTS

| | | | | |
|---|---|---|---|---|
| 4,093,437 A | * | 6/1978 | Ichihara et al. | ................. 55/487 |
| 5,283,106 A | * | 2/1994 | Seiler et al. | .................... 428/198 |
| 5,503,745 A | | 4/1996 | Ogata et al. | |
| 5,820,645 A | * | 10/1998 | Murphy, Jr. | ................. 55/385.3 |
| 5,997,789 A | | 12/1999 | Okumura et al. | |
| 6,966,939 B2 | * | 11/2005 | Rammig et al. | ................. 55/486 |
| 7,452,831 B2 | * | 11/2008 | Yamada et al. | ............... 442/239 |
| 2003/0222014 A1 | | 12/2003 | Nakajima et al. | |
| 2004/0083695 A1 | | 5/2004 | Schultink et al. | |
| 2006/0272303 A1 | | 12/2006 | Fujiwara et al. | |

FOREIGN PATENT DOCUMENTS

| | | |
|---|---|---|
| CN | 1198484 A | 11/1998 |
| CN | 1463785 A | 12/2003 |
| CN | 1761511 A | 4/2006 |
| EP | 0 947 549 A1 | 10/1999 |
| JP | 05-192520 A | 8/1993 |
| JP | 2000-079308 A | 3/2000 |
| JP | 2001-054706 A | 2/2001 |
| JP | 2008-080275 A | 4/2008 |
| KR | 10-2000-0019746 A | 4/2000 |
| KR | 10-2001-0008271 A | 2/2001 |

(Continued)

*Primary Examiner* — Robert Clemente
(74) *Attorney, Agent, or Firm* — Sughrue Mion, PLLC

(57) ABSTRACT

The present invention relates to a spunbonded filament nonwoven fabric and a method of preparing the same, and particularly to a multilayered spunbonded filament nonwoven fabric of which the fineness of the filaments decreases from an air inlet part toward an air outlet part, and a method of preparing the same. The spunbonded nonwoven fabric of the present invention can be used as an air filter for power generation equipment for a gas turbine, because it can reduce a pressure loss, promote filter efficiency, and extend the lifetime for use by using fiber layers having different denier.

13 Claims, 1 Drawing Sheet

FOREIGN PATENT DOCUMENTS

| | | |
|---|---|---|
| KR | 10-0323320 B1 | 1/2002 |
| KR | 10-2003-0046424 A | 6/2003 |
| KR | 10-2003-0094707 A | 12/2003 |
| KR | 10-0650144 B1 | 11/2006 |
| KR | 10-0715203 B1 | 4/2007 |

* cited by examiner

NONWOVEN FOR AIR FILTRATION AND A PREPARATION METHOD THEREOF

BACKGROUND OF THE INVENTION (a) Field of the Invention

The present invention relates to a spunbonded filament nonwoven fabric that can be used for an industrial filter, and a method of preparing the same.

(b) Description of the Related Art

Generally, a filter for a gas turbine is one of important parts that extend the life of components of the turbine by preventing damage, such as by contamination, corrosion, erosion, and the like, caused by particulate matter, and is directly related to power generation and efficiency because it improves compression and fuel efficiency.

However, the performance (collecting efficiency, pressure loss, and so on) of common filters changes during long-term use because they are affected by many environmental influences, particularly by weather, and thus the main function of collecting particulate matter is degenerated, physical performance is decreased, and the lifetime for use is shortened.

Recently, fibers that are used for a filter fabric for a gas turbine have been generally classified as cellulose-based fibers, glass fibers, and synthetic fibers. Korean Patent Publication No. 2003-0046424 discloses a product prepared by stacking cellulose and a nano-fiber web, and it has been generally used for a filter fabric for a gas turbine. However, the filter fabric is easily damaged by bad weather factors (for example rain or snow), and thus it is difficult to maintain uniform performance and use it for an extended period of time even though it is superior in its ability to filter dust (hereinafter, collecting efficiency). That is, particle pollutants in the air flow into the components of the turbine through a damaged part of the fabric, and the total efficiency of the filter is deteriorated.

Furthermore, a filter fabric including glass fibers in concert with staple fibers generates dust of small fibers when pleating the same, and it is problematic to use the filter because of the generated dust Because of the problems, the nonwoven fabric consisting of synthetic fibers is increasingly expected to be used as a nonwoven fabric for a gas turbine filter. However, products or patents regarding the nonwoven fabric for a gas turbine made of synthetic fibers are not yet sufficient.

Furthermore, in the case of a common synthetic fiber filter prepared so as to have a certain denier, there are problems in that the pressure loss is high because dust particles that are initially filtered block the pores of the filter fabric when filtering the air, and the collecting efficiency and the DHC (dust hold capacity) is accordingly degenerated.

Because of the problems, attempts to improve the properties of the collecting efficiency of the nonwoven fabric along with the pressure loss by varying the fiber density of each layer of an air filter or a nonwoven fabric for the same have been undertaken.

For example, Korean Patent Publication No. 2003-0094707 discloses a nonwoven fabric prepared by stacking 2 or more fiber layers, for example an air outlet layer, an intermediate layer, and an air inlet layer, having different densities, and a filter for an engine using the same. Korean Patent Publication No. 2001-0008271 discloses a filter fabric for an air cleaner of which a nonwoven fabric of staple fibers, wherein a dense layer, an intermediate layer, and a bulky layer are combined without a resin adhesive, has one or more density gradients, and a method of preparing the same. Furthermore, Korean Patent Publication No. 2000-0019746 discloses a polyester composite nonwoven fabric for a separator membrane supporting body, including a low density polyester nonwoven fabric prepared by a dry method as an upper layer and a high density polyester nonwoven fabric prepared by a wet method as a lower layer, and that is surface treated by multi-step calendaring.

However, common filters or nonwoven fabrics disclosed above also have limitations in showing sufficient and superior properties as a filter, because their density, volume, and air permeability based on the same of the filament fibers of each of the layers that have a density gradient are not optimized, and thus it is difficult to manifest deep filtration, the pressure loss is large, and they do not have sufficient mechanical strength, and thus the collecting efficiency for dust in the air or the DHC is still insufficient.

SUMMARY OF THE INVENTION

It is an aspect of the present invention to provide a spunbonded filament nonwoven fabric for a gas turbine filter of a thermal power plant, which is an air filter having superior collecting efficiency and DHC (dust hold capacity) while having superior air permeability and low pressure loss, and a method of preparing the same.

It is another aspect of the present invention to provide a filter for a gas turbine including the spunbonded filament nonwoven fabric.

In order to attain these objects, the present invention provides a spunbonded filament nonwoven fabric for an air filter that is a multilayered spunbonded filament nonwoven fabric of which the fineness of the filaments decreases from an air inlet part toward an air outlet part, wherein the air inlet part consists of polyester filament fibers having an average fineness of 4 to 6 denier (De'), the air outlet part consists of polyester filament fibers having an average fineness of 2 to 3 denier (De'), and the weight per unit area of the spunbonded nonwoven fabric is 130 to 200 g/m$^2$.

The present invention also provides a method of preparing a spunbonded filament nonwoven fabric for an air filter, including the steps of:

(a) preparing filament fibers by stacking the polyester filament fibers having an average fineness of 4 to 6 denier (De') and the polyester filament fibers having an average fineness of 2 to 3 denier (De') in a web form by a carding method, so that the layer of the polyester filament fibers having an average fineness of 4 to 6 denier (De') becomes an air inlet part and the layer of the polyester filament fibers having an average fineness of 2 to 3 denier (De') becomes an air outlet part;

(b) preparing a grey fabric of the spunbonded filament nonwoven fabric having a weight per unit area of 130 to 200 g/m$^2$ by using the filament fibers of the step (a); and (c) adjusting the thickness of the grey fabric of the step (b).

The present invention also provides a filter for a gas turbine prepared by using the spunbonded filament nonwoven fabric.

EXPLANATIONS FOR SIGNS OF THE PRINCIPAL PARTS OF THE DRAWINGS

| | |
|---|---|
| 10: | 4 to 6 denier filaments (air inlet part) |
| 20: | 2 to 3 denier filaments (air outlet part) |
| 1, 1': | spinning beam |
| 2, 2': | spinning die |
| 3: | air drawing device |
| 4: | net conveyor |
| 5: | calender roll |
| 6: | hot air dryer |
| 7: | tension controller |
| 8: | winder |

DETAILED DESCRIPTION OF THE EMBODIMENTS

Hereinafter, the present invention is explained in more detail.

The present invention is to provide an air filter, and particularly to provide a nonwoven fabric for a gas turbine filter of a thermal power plant, that is superior in collecting efficiency and DHC (dust hold capacity) while having superior air permeability and low pressure loss by providing a nonwoven fabric of which the fineness of the component fibers decreases from an air inlet part toward an air outlet part.

That is, the spunbonded filament nonwoven fabric of the present invention is an industrial nonwoven fabric, more particularly a spunbonded nonwoven fabric for an air filter that removes foreign substances from air that is flowing into a compressor of a gas turbine of a thermal power plant, and the present invention relates to a polyester spunbonded nonwoven fabric for a gas turbine power generation equipment where the fibers forming the nonwoven fabric are stacked in two types according to the denier (fineness) and the denier of the fibers decreases from an air inlet part toward an air outlet part, and a method of preparing the same.

Furthermore, the present invention can prevent high pressure loss, short lifetime for use, and low DHC (dust holding capacity) that are caused by early blocking of pores, because of using the large denier fibers to the air inlet part and the smaller denier fibers than above to the air outlet part.

Furthermore, the spunbonded filament nonwoven fabric can obtain excellent effect on removing foreign substances from the air without forming a separate intermediate layer between the air inlet part and the air outlet part.

The spunbonded filament nonwoven fabric of the present invention includes an air inlet part consisting of polyester filament fibers having an average fineness of 4 to 6 denier (De') and an air outlet part consisting of polyester filament fibers having an average fineness of 2 to 3 denier (De'), and the fiber layers of the air inlet part and the air outlet part may be one or more layers.

Hereinafter, the spunbonded nonwoven fabric according to a preferable embodiment of the present invention will be explained in more detail, referring to FIG. 1.

Figure 1:
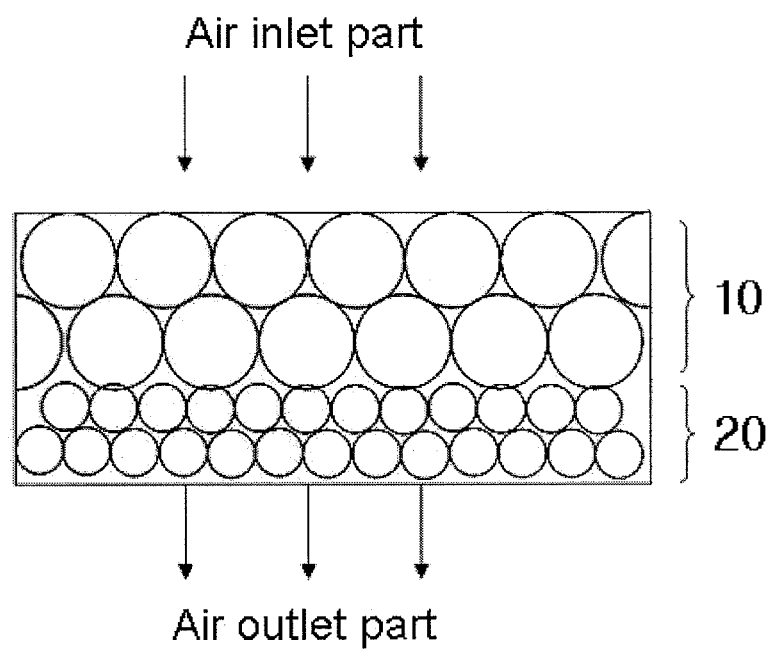
FIG. 1 is a schematic drawing of the filament structure composed of the nonwoven fabric of one embodiment of the present invention.

FIG. 1 is a schematic drawing showing that the spunbonded filament nonwoven fabric according to one embodiment of the present invention has a structure consisting of two layers of filament fibers having different average fineness. In FIG. 1, the direction of the air inlet part and the air outlet part of the component filaments is the same as illustrated.

Firstly, the spunbonded filament nonwoven fabric (or "nonwoven grey fabric") is explained.

Unlike usual nonwoven fabrics of which all layers are composed of filaments having same average fineness of a 3 denier (De') level, the spunbonded filament nonwoven fabric of the present invention has a characteristic that the average finenesses of the air inlet part and the air outlet part are different, as illustrated in FIG. 1. Furthermore, the spunbonded filament nonwoven fabric of the present invention is a spunbonded nonwoven fabric having a weight per unit area of 130 to 200 g/m². Therefore, the spunbonded filament nonwoven fabric of the present invention has an advantage in that it has a deep filtration property and good shape stability because its pleat formation (bending formation) is easy, when it is used to a filter fabric for a gas turbine.

It is preferable that the spunbonded filament nonwoven grey fabric consists of filament fibers and that the filament fibers are made of polyester resin.

In more detail, it is preferable that the polyester resin is one or more resins selected from the group consisting of polyethyleneterephthalate (PET), polynaphthaleneterephthalate (PEN), polybutyleneterephthalate (PBT), and a copolymer thereof. More preferably, the spunbonded filament nonwoven fabric of the present invention includes a polyester (first component) of which the melting point is 250° C. or more and a polyester (second component) of which the melting point is 20 to 50° C. lower than the above polyester, and their mixing ratio is not particularly limited in the present invention, however it may be 90:10 to 70:30 (first component:second component) in a weight ratio.

Furthermore, it is preferable that the air inlet part where air flows in and the air outlet part where the air flows out have different average finenesses of the filament fibers. This is because it is advantageous for DHC (dust holding capacity) of the filter fabric, deep filtration is possible, and the collecting efficiency and the pressure loss are good. Therefore, it is preferable that the average fineness of the filaments of the air inlet part where air flows in is 4 to 6 denier (De') in the spunbonded filament nonwoven fabric of the present invention (10 in FIG. 1). When the average fineness of the filaments of the air inlet part is lower than 4 denier, there is a problem of low DHC because it has a relatively high pressure loss and cannot achieve deep filtration, and when the average fineness of the filaments of the air inlet part is over 6 denier, there is a problem of relatively low collecting efficiency because of the thick denier of the component fibers. Furthermore, it is preferable that the average fineness of the filaments of the air outlet part where air flows out is 2 to 3 denier (De') in the spunbonded filament nonwoven fabric of the present invention (20 in FIG. 1). When the average fineness of the filaments is lower than 2 denier, there is a problem of high pressure loss even though the collecting efficiency is good, and when the average fineness of the filaments is over 3 denier, there is a problem of low collecting efficiency.

In the fiber structure of the present invention, the air inlet part of 4 to 6 denier is advantageous because the pressure loss is low when the air flows in, and the air outlet part is advantageous in terms of collecting efficiency because its average fineness is 2 to 3 denier. Further, the filter fabric composed of two layers having different finenesses as above is advantageous in the point of DHC because it makes deep filtration possible. Namely, when all parts of the nonwoven fabric are composed of only the fibers having an average fineness of 2 to 3 denier as usual, the pressure loss increases during the air flows into the part of fibers of 2 to 3 denier because dust particles collected earlier block the pores of the filter fabric. Therefore, in this case, the dust is collected only at the air inlet part where the air flows in and it is impossible to collect the dust at the next part, and accordingly the high pressure loss appears early and the DHC also deteriorates. Therefore, it is impossible to use the filter fabric for a long time. However, the problems disclosed above can be prevented in the present invention by making the average fineness of the air inlet part and the air outlet part different.

Furthermore, it is preferable that the weight per unit area of the spunbonded nonwoven fabric is 130 g/m$^2$ or more in order to show superior efficiency and pleat quality as a filter fabric, and it is also preferable that the weight per unit area is 200 g/m$^2$ or less in order to obtain a suitable thickness of a supporting body and maintain superior pressure loss. Here, when the weight per unit area of the nonwoven fabric is less than 130 g/m$^2$, the fabric is insufficient for a filter fabric because the collecting efficiency decreases and its shape maintaining property is not good when the fabric is bent. Furthermore, when the weight is over 200 g/m$^2$, it is impossible to use the fabric for a long time and thus the filter changing cycle is reduced.

In addition, in the spunbonded nonwoven grey fabric of the present invention, the spunbonded fabric preferably has a thickness of 0.4 to 0.8 mm and more preferably has a thickness of 0.5 to 0.7 mm considering deep filtration, superior DHC, and low pressure loss. When the thickness is less than 0.4 mm, the pressure loss is increased and the DHC is reduced even though the collecting efficiency is good because the pores existing in the nonwoven fabric of a filter fabric are small at that degree. Also, when the thickness is over 0.8 mm, it is difficult to show uniform filtering performance because the shape stability is inferior when the fabric is pleated into a mountain form, and the collecting efficiency to dust also decreases because of the structure of the nonwoven fabric that is not dense.

The spunbonded filament nonwoven grey fabric of the present invention can be used for a filter fabric, and the spunbonded filament nonwoven grey fabric preferably has tensile strength of 25 kgf/5 cm or more at both of length and width directions, in order to endure the external force that is applied to the nonwoven fabric when the fabric is pleated in a mountain form. The tensile strength is not absolutely and largely required for the nonwoven fabric used as a filter fabric, however, tensile strength of at least 25 kgf/5 cm is required in order to prevent a hairiness occurrence and tearing of the fabric when the fabric is pleated, and damage to the fabric when it is used for a long time.

Furthermore, the air permeability of the nonwoven fabric is preferably 30 ccs to 100 ccs in order to have superior collecting efficiency performance while making smooth air flow possible. When the air permeability is less than 30 ccs, the pressure loss appears high because the pores of the nonwoven fabric are small at that degree, and it is disadvantageous to be used for a long time due to this. Furthermore, when the air permeability is over 100 ccs, it is possible to use the fabric for a long time but the performance as a filter fabric is insufficient in terms of collecting efficiency.

Furthermore, the nonwoven fabric according to the present invention has characteristics in that the pressure loss is 20 to 60 mmAq which is lower than that of the usual fabric, and the DHC (dust hold capacity) is 1.3 g or more.

Furthermore, the present invention provides a method of preparing the spunbonded filament nonwoven fabric.

The method of preparing a filter fabric for a gas turbine according to the present invention includes the steps of preparing filament fibers by adjusting the average fineness of an air outlet part and an air inlet part, and preparing a grey fabric of the spunbonded filament nonwoven fabric by adjusting a weight per unit area and a thickness by using the filament fibers.

More preferably, the method of the present invention includes the steps of:

(a) preparing filament fibers by stacking the polyester filament fibers having an average fineness of 4 to 6 denier (De') and the polyester filament fibers having an average fineness of 2 to 3 denier (De') in a web form according to a carding method, so that the layer of the polyester filament fibers having an average fineness of 4 to 6 denier (De') becomes an air inlet part and the layer of the polyester filament fibers having an average fineness of 2 to 3 denier (De') becomes an air outlet part;

(b) preparing a grey fabric of the spunbonded filament nonwoven fabric having a weight per unit area of 130 to 200 g/m$^2$ by using the filament fibers of the step (a); and (c) adjusting the thickness of the grey fabric of the step (b).

Figure 2:
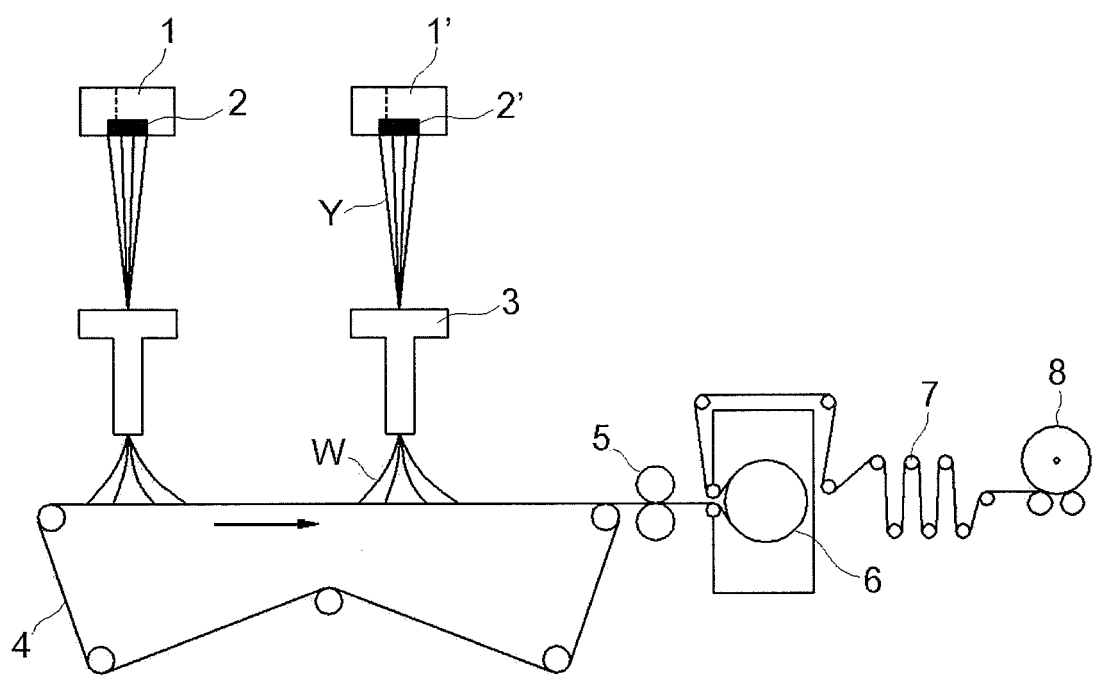
FIG. 2 is a schematic drawing of the device for preparing the spunbonded nonwoven fabric of the present invention.

In the step of (a) preparing the filament fibers, one or more of polyester resin materials are firstly melted in a continuous extruder and filaments are continuously spun by adjusting the discharging amount and the number of orifices. After this, the spun filament are preferably solidified by a cooling wind of 20 to 40° C., and drawn by using a high pressure air drawing device so that the spinning speed is 4500 to 5500 m/min. At this time, the method of preparing the fibers having different denier of the present invention may follow the method disclosed in Korean Patent No. 10-0650144. The present invention can prepare the nonwoven fabric of two layers having different denier of filament fibers by arranging the spinning dies having different number of orifices in two rows, as concretely illustrated in FIG. 2. FIG. 2 briefly shows the device for preparing the spunbonded nonwoven fabric of the present invention. In FIG. 2, the symbol 1, 1' means spinning beam, 2, 2' means spinning die, 3 means air drawing device, 4 means net conveyor, 5 means calendar roll, 6 means hot air dryer, 7 means tension controller, and 8 means winder.

Subsequently, the present invention carries out the step of (b) preparing the spunbonded filament nonwoven grey fabric by using the filament fibers of the step (a). In the step (b), the nonwoven grey fabric can be prepared by the method of stacking the filament fibers prepared in the step (a) in a web form on a net made of metal that is continuously moving according to a carding method, and thermal-bonding the web (using a calendar roll and a hot air dryer).

After this, (c) the present invention adjusts the thickness of the nonwoven grey fabric of the step (b) to be 0.4 mm to 0.8 mm The present invention can also provide a filter for a gas turbine of a thermal power plant prepared by using the spunbonded filament nonwoven fabric.

The filter for a gas turbine of the present invention is easy to manufacture in quantity and is economically advantageous in comparison with the filter fabric composed of usual cellulose and nanofibers and the supporting body composed of glass fibers, and it is not harmful to the human body, because it uses the spunbonded filament nonwoven fabric composed of two layers having different fineness of the filaments.

As shown above, the spunbonded filament nonwoven fabric of the present invention has an effect of providing the filter fabric that has superior filtering efficiency, low pressure loss, and long filter changing cycle, and is profitable in terms of power generating efficiency because of the deep filtration property that is obtained by the structure of which the fineness of the filaments decreases from the air inlet part toward the air outlet part. Furthermore, the present invention can provide a nonwoven fabric that has superior mechanical properties, workability, and shape stability and can be used for a long time, because the fabric is easy to manufacture in quantity, not harmful to the human body, and not largely affected by the surroundings, particularly by the weather. Therefore, the filter fabric using the nonwoven fabric according to the present invention can be easily applied to a filter of industrial gas turbine facilities, especially of gas turbine facilities for a power plant, and can show superior filtering performance.

Hereinafter, preferable examples and comparative examples are presented for understanding the present invention. However, the following examples are only for illustrating the present invention and the present invention is not limited to or by them.

EXAMPLES

Example 1

(Preparation of Filament Fibers)

80 wt % of polyethyleneterephthalate (PET) resin with a high melting point (melting point: 254° C.) and 20 wt % of polyethyleneterephthalate (Co-PET) resin with a low melting point (melting point: 220° C., containing 18 mole/wt % of adipic acid) were used as raw materials. The mixing ratio of the raw materials can be ordinarily determined in a range where the principal ingredient and the accessory component can be identified.

The PET resins were melted at a spinning temperature of 288° C. by using a continuous extruder, and then the discharging amount and the number of orifices were adjusted so that the average fineness of the fibers of the air outlet part was about 3 denier (De') and the average fineness of the fibers of the air inlet part was about 5 denier (De') after drawing. Subsequently, the filament fibers were prepared by solidifying the continuous filament discharged from the orifices with cooling air at 25° C. and sufficiently drawing the same by using a high pressure air drawing device so that the spinning speed was 5000 m/min.

(Preparation of Spunbonded Nonwoven Grey Fabric)

Subsequently, the filaments were stacked in a web form on a net made of metal that was continuously moving according to a common carding method. The stacked filament fibers were adhered through a hot air dryer of 225° C. after adhering the web firstly at a calendar roll of 155° C. By this, a spunbonded filament nonwoven grey fabric having a weight per unit area of 150 g/m² was prepared. Furthermore, a filter fabric for a gas turbine was prepared by adjusting the thickness of the spunbonded nonwoven fabric to be 0.6 mm.

Example 2

(Preparation of Filament Fibers)

The filament fibers were prepared substantially according to the same method as in Example 1, except that the average fineness of the filament fibers of the air outlet part was adjusted to be 3 denier, and the average fineness of the filament fibers of the air inlet part was adjusted to be 6 denier (De').

(Preparation of Spunbonded Nonwoven Grey Fabric)

The nonwoven grey fabric was prepared substantially according to the same method as in Example 1.

Example 3

(Preparation of Filament Fibers)

The filament fibers were prepared substantially according to the same method as in Example 1, except that the average fineness of the filament fibers of the air outlet part was adjusted to be 3 denier, and the average fineness of the filament fibers of the air inlet part was adjusted to be 4 denier (De').

(Preparation of Spunbonded Nonwoven Grey Fabric)

The nonwoven grey fabric was prepared substantially according to the same method as in Example 1.

Example 4

(Preparation of Filament Fibers)

The filament fibers were prepared substantially according to the same method as in Example 1, except that the average fineness of the filament fibers of the air outlet part was adjusted to be 2 denier, and the average fineness of the filament fibers of the air inlet part was adjusted to be 4 denier (De').

(Preparation of Spunbonded Nonwoven Grey Fabric)

The nonwoven grey fabric was prepared substantially according to the same method as in Example 1.

Example 5

(Preparation of Filament Fibers)

The filament fibers were prepared substantially according to the same method as in Example 1, except that the average fineness of the filament fibers of the air outlet part was adjusted to be 2 denier, and the average fineness of the filament fibers of the air inlet part was adjusted to be 6 denier (De').

(Preparation of Spunbonded Nonwoven Grey Fabric)

The nonwoven grey fabric was prepared substantially according to the same method as in Example 1.

Example 6

(Preparation of Filament Fibers)

The filament fibers were prepared substantially according to the same method as in Example 1.

(Preparation of Spunbonded Nonwoven Grey Fabric)

The nonwoven grey fabric was prepared substantially according to the same method as in Example 1, except that the weight of the nonwoven fabric was 130 g/m².

Example 7

(Preparation of Filament Fibers)

The filament fibers were prepared substantially according to the same method as in Example 1.

(Preparation of Spunbonded Nonwoven Grey Fabric)

The nonwoven grey fabric was prepared substantially according to the same method as in Example 1, except that the weight of the nonwoven fabric was 200 g/m².

Example 8

(Preparation of Filament Fibers)

The filament fibers were prepared substantially according to the same method as in Example 1.

(Preparation of Spunbonded Nonwoven Grey Fabric)

The nonwoven grey fabric was prepared substantially according to the same method as in Example 1, except that the thickness of the nonwoven fabric was 0.4 mm.

Example 9

(Preparation of Filament Fibers)

The filament fibers were prepared substantially according to the same method as in Example 1.

(Preparation of Spunbonded Nonwoven Grey Fabric)

The nonwoven grey fabric was prepared substantially according to the same method as in Example 1, except that the thickness of the nonwoven fabric was 0.8 mm.

Comparative Examples

Comparative Example 1

(Preparation of Filament Fibers)

The filament fibers were prepared substantially according to the same method as in Example 1, except that both average finenesses of the filament fibers of the air outlet part and the air inlet part were adjusted to be 2 denier (De').

(Preparation of Spunbonded Nonwoven Grey Fabric)

The nonwoven grey fabric was prepared substantially according to the same method as in Example 1.

Comparative Example 2

(Preparation of Filament Fibers)

The filament fibers were prepared substantially according to the same method as in Example 1, except that both average finenesses of the filament fibers of the air outlet part and the air inlet part were adjusted to be 7 denier (De').

(Preparation of Spunbonded Nonwoven Grey Fabric)

The nonwoven grey fabric was prepared substantially according to the same method as in Example 1.

Comparative Example 3

(Preparation of Filament Fibers)

The filament fibers were prepared substantially according to the same method as in Example 1.

(Preparation of Spunbonded Nonwoven Grey Fabric)

The nonwoven grey fabric was prepared substantially according to the same method as in Example 1, except that the weight of the nonwoven fabric was 120 g/m².

Comparative Example 4

(Preparation of Filament Fibers)

The filament fibers were prepared substantially according to the same method as in Example 1.

(Preparation of Spunbonded Nonwoven Grey Fabric)

The nonwoven grey fabric was prepared substantially according to the same method as in Example 1, except that the weight of the nonwoven fabric was 210 g/m².

Comparative Example 5

(Preparation of Filament Fibers)

The filament fibers were prepared substantially according to the same method as in Example 1.

(Preparation of Spunbonded Nonwoven Grey Fabric)

The nonwoven grey fabric was prepared substantially according to the same method as in Example 1, except that the thickness of the nonwoven fabric was 0.3 mm.

Comparative Example 6

(Preparation of Filament Fibers)

The filament fibers were prepared substantially according to the same method as in Example 1.

(Preparation of Spunbonded Nonwoven Grey Fabric)

The nonwoven grey fabric was prepared substantially according to the same method as in Example 1, except that the thickness of the nonwoven fabric was 0.9 mm.

Comparative Example 7

(Preparation of Filament Fibers)

The filament fibers were prepared substantially according to the same method as in Example 1, except that the average fineness of the filament fibers of the air outlet part was adjusted to be 1 denier (De'), and the average fineness of the filament fibers of the air inlet part was adjusted to be 5 denier (De').

(Preparation of Spunbonded Nonwoven Grey Fabric)

The nonwoven grey fabric was prepared substantially according to the same method as in Example 1.

Comparative Example 8

(Preparation of Filament Fibers)

The filament fibers were prepared substantially according to the same method as in Example 1, except that the average fineness of the filament fibers of the air outlet part was adjusted to be 2 denier (De'), and the average fineness of the filament fibers of the air inlet part was adjusted to be 7 denier (De').

(Preparation of Spunbonded Nonwoven Grey Fabric)

The nonwoven grey fabric was prepared substantially according to the same method as in Example 1.

Comparative Example 9

(Preparation of Filament Fibers)

The filament fibers were prepared substantially according to the same method as in Example 1, except that the average fineness of the filament fibers of the air outlet part was adjusted to be 1 denier (De'), and the average fineness of the filament fibers of the air inlet part was adjusted to be 3 denier (De').

(Preparation of Spunbonded Nonwoven Grey Fabric)

The nonwoven grey fabric was prepared substantially according to the same method as in Example 1.

The details of the nonwoven filter fabrics for a gas turbine according to the examples and comparative examples are listed in the following Table 1.

TABLE 1

| Classification | Materials of the nonwoven fabric | Average fineness of the filaments (De) (air outlet/air inlet) | Weight of the nonwoven grey fabric (g/m²) | Thickness (mm) |
| --- | --- | --- | --- | --- |
| Example 1 | PET/Co-PET | 3/5 | 150 | 0.6 |
| Example 2 | PET/Co-PET | 3/6 | 150 | 0.6 |
| Example 3 | PET/Co-PET | 3/4 | 150 | 0.6 |
| Example 4 | PET/Co-PET | 2/4 | 150 | 0.6 |
| Example 5 | PET/Co-PET | 2/6 | 150 | 0.6 |
| Example 6 | PET/Co-PET | 3/5 | 130 | 0.6 |
| Example 7 | PET/Co-PET | 3/5 | 200 | 0.6 |
| Example 8 | PET/Co-PET | 3/5 | 150 | 0.4 |

TABLE 1-continued

| Classification | Materials of the nonwoven fabric | Average fineness of the filaments (De) (air outlet/air inlet) | Weight of the nonwoven grey fabric (g/m²) | Thickness (mm) |
|---|---|---|---|---|
| Example 9 | PET/Co-PET | 3/5 | 150 | 0.8 |
| Comparative Example 1 | PET/Co-PET | 2/2 | 150 | 0.6 |
| Comparative Example 2 | PET/Co-PET | 7/7 | 150 | 0.6 |
| Comparative Example 3 | PET/Co-PET | 3/5 | 120 | 0.6 |
| Comparative Example 4 | PET/Co-PET | 3/5 | 210 | 0.6 |
| Comparative Example 5 | PET/Co-PET | 3/5 | 150 | 0.3 |
| Comparative Example 6 | PET/Co-PET | 3/5 | 150 | 0.9 |
| Comparative Example 7 | PET/Co-PET | 1/5 | 150 | 0.6 |
| Comparative Example 8 | PET/Co-PET | 2/7 | 150 | 0.6 |
| Comparative Example 9 | PET/Co-PET | 1/3 | 150 | 0.6 |

Note)
PET: Polyethyleneterephthalate with high melting point
Co-PET: Polyethyleneterephthalate with low melting point Experimental Examples Tensile strength, air permeability, collecting efficiency, pressure loss, and DHC (dust hold capacity) of the nonwoven filter fabrics for a gas turbine prepared in the examples and comparative examples were tested as disclosed below, and the results are listed in the following Tables 2 and 3.

Experimental Example 1

Tensile Strength (Kg/5 cm)

The KS K 0520 method was used. More concretely, the measurement was carried out by using a specimen having a size of width×length=20 cm×5 cm and a tensile tester of INSTRON Co. with an extension speed of 200 mm/min. Each tensile strength of the sample to MD (machine direction) and CD (cross direction) was determined during the measurement.

Experimental Example 2

Air Permeability (ccs)

The ASTM D 737 method was used. More concretely, the measurement was carried out with a specimen having a size of 38 cm² with air pressure of 125 pa.

Experimental Example 3

Collecting Efficiency (%)

The measurement was carried out with a specimen having a size of width×length=0.525 cm×0.225 cm and a wind speed of 75.6 m³/h. At this time, ISO-12103-1 A2 Fine Test Dust was used as the dust, and the concentration was 20 mg/m³. The collecting efficiency was classified according to the particle size (0.3~0.5 μm/0.5~1.0 μm/1.0~3.0 μm/3.0~5.0 μm/5.0~10.0 μm).

Experimental Example 4

Pressure Loss (mmAq)

The initial pressure loss of before and after passing the filter was measured with the wind speed of 75.6 m³/h as in Experimental Example 3 (RS K 0011).

Experimental Example 5

DHC (g)

The weight of the dust collected in the filter when the final pressure became 2.5 times was measured with the same sample and wind speed as in Experimental Example 3, and the dust concentration was 70 mg/m³ (RS K 0011).

TABLE 2

| Classification | | Example 1 | Example 2 | Example 3 | Example 4 | Example 5 | Example 6 | Example 7 | Example 8 | Example 9 |
|---|---|---|---|---|---|---|---|---|---|---|
| Characteristics of Filter fabric | Tensile strength (MD) | 55 | 56 | 57 | 54 | 55 | 42 | 63 | 57 | 53 |
| | Tensile strength (CD) | 27 | 28 | 28 | 27 | 27 | 25 | 29 | 28 | 25 |
| | Air permeability | 84 | 89 | 49 | 42 | 68 | 98 | 31 | 41 | 97 |
| | Collecting efficiency (%) 0.3~0.5 μm | 48.2 | 47.1 | 51.2 | 56.7 | 51.7 | 42.1 | 57.8 | 50.6 | 44.2 |
| | 0.5~1.0 μm | 56.9 | 54.2 | 59.8 | 65.2 | 61.0 | 51.0 | 66.3 | 59.3 | 53.1 |
| | 1.0~3.0 μm | 68.2 | 65.7 | 72.3 | 78.1 | 74.2 | 59.3 | 70.3 | 70.2 | 64.5 |
| | 3.0~5.0 μm | 84.3 | 80.3 | 85.1 | 89.2 | 85.7 | 70.9 | 82.8 | 85.3 | 82.7 |
| | 5.0~10.0 μm | 92.7 | 91.2 | 94.2 | 95.3 | 95.0 | 86.0 | 94.1 | 93.0 | 89.3 |
| | Pressure loss | 28.6 | 26.5 | 39.6 | 47.2 | 44.3 | 18.9 | 56.1 | 48.2 | 24.1 |
| | DHC | 2.3 | 2.3 | 1.9 | 1.7 | 1.8 | 1.7 | 2.8 | 2.0 | 2.4 |
| Total performance | | ◎ | ◎ | ◎ | ◎ | ◎ | ○ | ◎ | ○ | ○ |

TABLE 3

| Classification | | Com. Example 1 | Com. Example 2 | Com. Example 3 | Com. Example 4 | Com. Example 5 | Com. Example 6 | Com. Example 7 | Com. Example 8 | Com. Example 9 |
|---|---|---|---|---|---|---|---|---|---|---|
| Characteristics of Filter fabric | Tensile strength (MD) | 53 | 57 | 40 | 67 | 58 | 47 | 52 | 54 | 51 |
| | Tensile strength (CD) | 25 | 27 | 21 | 33 | 29 | 22 | 24 | 26 | 26 |
| | Air permeability | 36 | 106 | 120 | 27 | 29 | 115 | 30 | 42 | 26 |
| Collecting efficiency (%) | 0.3~0.5 μm | 52.7 | 40.1 | 39.2 | 58.3 | 53.0 | 42.2 | 47.2 | 48.2 | 59.3 |
| | 0.5~1.0 μm | 65.5 | 49.7 | 48.0 | 66.9 | 61.2 | 51.3 | 61.2 | 53.1 | 71.2 |
| | 1.0~3.0 μm | 80.2 | 56.3 | 57.3 | 73.3 | 84.9 | 59.7 | 78.1 | 60.1 | 88.3 |
| | 3.0~5.0 μm | 93.1 | 67.5 | 69.2 | 84.0 | 95.1 | 67.2 | 90.1 | 73.3 | 96.1 |
| | 5.0~10.0 μm | 97.8 | 72.1 | 73.6 | 95.2 | 98.3 | 78.5 | 95.7 | 87.4 | 98.9 |
| | Pressure loss | 63.6 | 17.1 | 15.8 | 74.7 | 65 | 14.1 | 62.1 | 27.0 | 69 |
| | DHC | 1.2 | 1.6 | 1.3 | 1.3 | 1.2 | 1.5 | 1.3 | 1.2 | 1.1 |
| Total performance | | Δ | X | X | X | X | Δ | Δ | Δ | X |

From the results of Tables 2 and 3, it can be known that Examples 1 to 9 of the present invention show low pressure loss, and superior tensile strength of the length direction and width direction, air permeability, and DHC, in comparison with Comparative Examples 1 to 9, and their filtering efficiencies are excellent because of the different denier of the air inlet part and the air outlet part.

The spunbonded filament nonwoven fabric of the present invention can be usefully applied to an industrial filter, especially to a filter fabric of a gas turbine for a power plant, because it shows excellent filtering efficiency and low pressure loss.

While this invention has been explained in connection with the preferable embodiments, it is to be understood that the present invention is not limited to the disclosed embodiments, but, on the contrary, is possible to cover various modifications and executions within the spirit and scope of the appended claims, the detailed description of the invention, and the appended drawings, and is clearly included in the scope of the present invention.

What is claimed is:

1. A nonwoven fabric comprising a multilayered spunbonded filaments, said nonwoven fabric being suitable for an air filter and said multilayered structure comprising an air inlet part and an air outlet part of an air filter,
    wherein the air inlet part comprises first filament fibers and the air outlet part comprises second filament fibers,
    wherein the first filament fibers are polyester filament fibers having an average fineness of 4 to 6 denier (De'),
    wherein the second filament fibers are polyester filament fibers having an average fineness of 2 to 3 denier (De'),
    wherein the weight per unit area of the nonwoven fabric is 130 to 200 g/m$^2$, and
    wherein the thickness of the nonwoven fabric is 0.4 mm to 0.8 mm.

2. The nonwoven fabric according to claim 1, wherein the polyester filament fibers are prepared from a polyester resin selected from the group consisting of polyethyleneterephthalate, polynaphthaleneterephthalate, and polybutyleneterephthalate.

3. The nonwoven fabric according to claim 1, which has the tensile strength in the length and width directions of 25 kgf/5 cm or more.

4. The nonwoven fabric according to claim 1, which has an air permeability of 30 to 100 ccs.

5. The nonwoven fabric according to claim 1, which has a pressure loss of 20 to 60 mmAq.

6. The nonwoven fabric according to claim 1, which has a dust hold capacity of 1.3 g or more.

7. A method of preparing the nonwoven fabric of claim 1, including the steps of:
    (a) preparing filament fibers by stacking the polyester filament fibers having an average fineness of 4 to 6 denier (De') and the polyester filament fibers having an average fineness of 2 to 3 denier (De') in a web form by a carding method, so that the part comprising the polyester filament fibers having an average fineness of 4 to 6 denier (De') becomes an air inlet part and the par comprising the polyester filament fibers having an average fineness of 2 to 3 denier (De') becomes an air outlet part;
    (b) preparing a grey fabric of the spunbonded filament nonwoven fabric having a weight per unit area of 130 to 200 g/m$^2$ by using the filament fibers of the step (a); and
    (c) adjusting the thickness of the grey fabric of the step (b) to be in the range from 0.4 mm to 0.8 mm.

8. A gas turbine filter comprising the nonwoven fabric according to claim 1.

9. The gas turbine filter according to claim 8, wherein the polyester filament fibers are prepared from a polyester resin selected from the group consisting of polyethyleneterephthalate, polynaphthaleneterephthalate, and polybutyleneterephthalate.

10. The gas turbine filter according to claim 8, wherein the nonwoven fabric has the tensile strength in the length and width directions of 25 kgf/5 cm or more.

11. The gas turbine filter according to claim 8, wherein the nonwoven fabric has an air permeability of 30 to 100 ccs.

12. The gas turbine filter according to claim 8, wherein the nonwoven fabric has a pressure loss of 20 to 60 mmAq.

13. The gas turbine filter according to claim 8, wherein the nonwoven fabric has a dust hold capacity of 1.3 g or more.

* * * * *